May 8, 1934.　　　　J. M. VAN DER POEL　　　　1,958,254
APPARATUS FOR SEPARATING A SINGLE CYLINDRICAL ARTICLE
FROM A QUANTITY OF SUCH ARTICLES
Filed Nov. 2, 1932　　　2 Sheets-Sheet 2
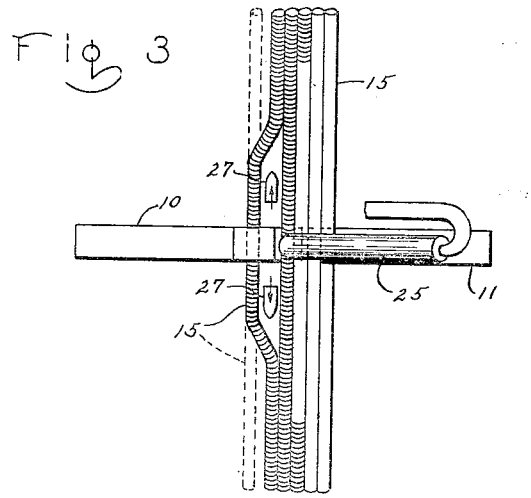
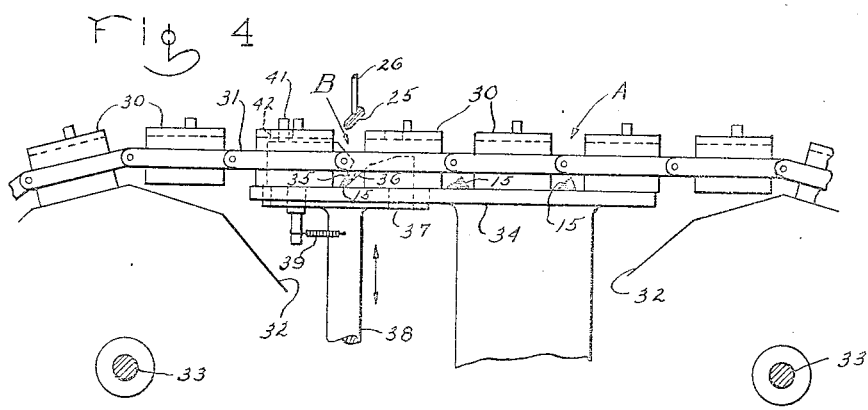
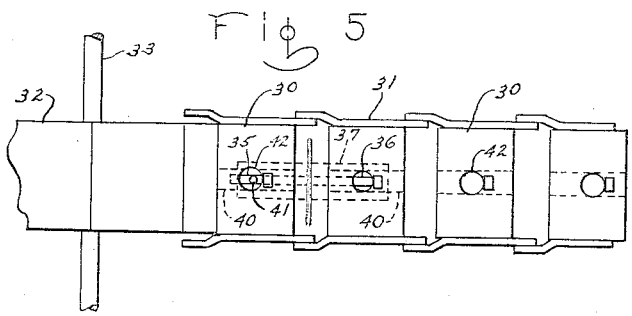
INVENTOR
JOHANNES M. V. D. POEL
BY Charles V. Mullan
HIS ATTORNEY Patented May 8, 1934

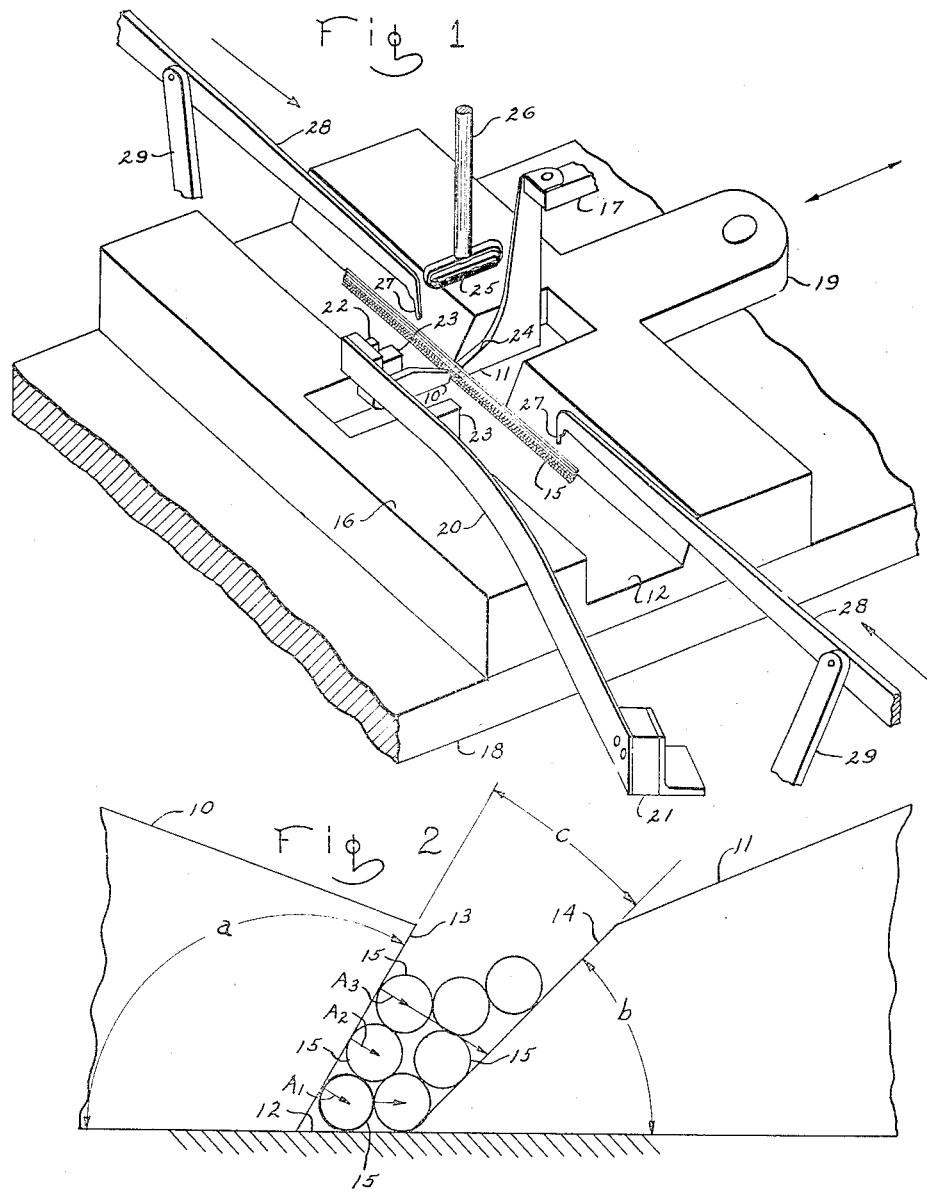

1,958,254

UNITED STATES PATENT OFFICE 1,958,254

APPARATUS FOR SEPARATING A SINGLE CYLINDRICAL ARTICLE FROM A QUANTITY OF SUCH ARTICLES

Johannes Marinus van der Poel, Eindhoven, Netherlands, assignor to General Electric Company, a corporation of New York Application November 2, 1932, Serial No. 640,848
In the Netherlands November 20, 1931

8 Claims. (Cl. 140—132)

My invention relates to apparatus for separating a single cylindrical article from a quantity of such articles. The apparatus comprising my invention is particularly adaptable for use in separating filaments for incandescent lamps and similar articles, although it may be applied to other cylindrical bodies such as glass tubes and electrode wires. The said filaments, especially those of small diameter, have very little stiffness and consequently they are quite easily bent by the slightest forces, such as those caused by the circulation of air in the factory. The filaments tend to curl up, so that a quantity of them are invariably so entangled as to render their separation extremely difficult, since any pressure applied in a direction perpendicular to their axes serves to jam them more tightly together. For this reason, separation of the filaments has heretofore been done entirely by hand. One of the objects of my invention is to provide apparatus for performing said separation automatically and efficiently.

According to my invention the apparatus comprises two jaws between which a quantity of the cylindrical articles such as filaments are placed, said jaws being relatively movable and so shaped that as they close together one of said articles is gripped therebetween while the remainder are pushed away without being gripped. Additional elements may be provided which further remove said remaining articles from said gripped article to facilitate removal thereof from the apparatus. In the case of flexible articles such as filaments, it is desirable to further provide a pair of fingers which enter the space between the gripped filament and the remaining filaments at each side of the separating jaws then move in a direction perpendicular to the direction of motion of said jaws. In this manner each end of the gripped filament is separated from the quantity of remaining filaments to which it tends to cling. Additional features and advantages of my invention will appear from the following detailed description of species thereof and from the drawings.

In the drawings Fig. 1 is a perspective view of apparatus comprising my invention; Fig. 2 is a detailed diagrammatic view of separating jaws; Fig. 3 is a detailed plan view of said jaws; Fig. 4 is an elevation of a modified form of apparatus comprising my invention; and Fig. 5 is a plan view thereof.

Referring to Fig. 2, my invention comprises two jaws 10 and 11 which move with respect to each other over a smooth substantially horizontal plane surface 12. The surface 13 of the jaw 10 forms an angle "$a$", preferably of approximately 120° with the surface 12, while the surface 14 of the jaw 11 forms an angle "$b$" preferably of approximately 45° with said surface 12. The jaw 10 is preferably made movable and the jaw 11 stationary. As said jaw 10 advances toward said jaw 11 it exerts forces $A_1$, $A_2$, $A_3$ on the cylindrical bodies 15 with which it comes in contact, said bodies in turn exerting pressure on adjacent bodies. It becomes apparent that the angle "$a$" must be of such a magnitude as to preclude the jamming of the articles 15 by being forced into each other. This angle should be approximately 120° for best results, although small deviations are possible due to the frictional forces between the various moving bodies. As seen from the drawings, with an angle "$a$" of 120° the forces $A_2$, $A_3$ on the bodies 15 adjacent to the surface 13 pass between the adjacent bodies which are consequently pushed up along the surface 14 of jaw 11 without jamming. This action continues until one single body 15 remains at the bottom of the pile gripped between the surfaces 13 and 14 with the remaining bodies lying above said gripped body. The said remaining bodies will not be held because of the divergence of the surfaces 13—14 from each other as shown by angle $c$. The said angle $c$ also has a maximum value since, if it is too great, the lowermost body 15 will not be held, but will slide up between the two jaws. This maximum value of angle $c$ seems to be approximately 15°. This then also determines the minimum value of the angle $b$ of the surface 14 which is then approximately 45°, thereby also allowing said bodies 15 to be easily pushed up along said surface 14.

Referring now to Fig. 1, a quantity of cylindrical bodies 15 which in this case are filaments, are placed between the jaws 10—11 on the smooth polished surface 12 which comprises the floor of a channel in a block 16. The said jaw 11 is fixedly mounted on a bar 17 which is mounted on the frame of the machine (not shown). The block 16 is mounted on a plate 18 and is adapted to be reciprocated thereon by mechanism not shown which engages an ear 19 on said block. The jaw 10 is mounted on one end of a leaf spring 20, the other end of which is mounted on a block 21 which is mounted on an undesignated portion of the plate 18. The block 16 is moved to the right in Fig. 1 and the jaw 10, bearing against a peg 22 on said block, is moved toward the jaw 11 by the spring 20. This causes the hereinbefore described separating action to take place as described in connection with Fig. 2. After the lowermost coil has been gripped by said jaws 10—11, the block 16 continues to move to the right and displacing elements 23 comprising projections thereon push back the excess coils on to the surface 24 of the jaw 11. As shown in Fig. 3, the gripped filament is held in the jaws 10—11 and at the same time is bowed back at its center. A retaining finger 25, comprising a rubber tube or band mounted on the end of rod 26 and located directly over the surface of the jaw 11, is then lowered upon the separated group of filaments, holding them down against the surface 24 of said jaw 11. The block 16 is now moved to the left in Fig. 1 to withdraw the projections 23 from the coils 15 and the two fingers 27 on the ends of bars 28 move down to the surface 12, one on each side of the jaws 10—11, and enter the space between the gripped coil and the remainder as shown in Fig. 3. Said fingers 27 are now moved out by arms 29 in a straight line parallel to the coils thus separating the legs of the gripped coil from the remaining coils leaving said gripped coil free and clear of the rest of the group ready to be picked up by filament mounting apparatus and delivered to the mounting machine. The active surfaces of the jaws 10—11 are preferably made narrow to minimize the possibility of damage to the filaments.

I do not wish to limit myself to flexible articles such as filaments, since by substituting for the projections 23 a wedge or gripper which enters between the clamped article and the remainder and pushes said remainder away from the jaws, it is possible to separate cylindrical articles in general.

In Figs. 4 and 5 is shown a multiple feed device comprising a plurality of blocks 30 connected by a chain 31 and driven by wheels 32 mounted on shafts 33. Said blocks 30 are pulled across the surface of a stationary plate 34 and coils 15 are placed between said blocks 30 at position A. The said coils 15 are separated at position B by two jaws 35—36 corresponding to the jaws 10 and 11 respectively of Fig. 1. Said jaws are mounted on a table 37 which is mounted on a rod 38, the jaw 36 being fixedly mounted thereon while the jaw 35 is slidably mounted thereon and normally pulled to the right by a spring 39. When a group of coils 15 has arrived at position B, the table 37 is raised to the position shown in the drawings through a slot in the plate 34, the jaws 35—36 entering slots 40 in the blocks 30, and a peg 41 in the top of the jaw 35 passing through a hole 42 in the block 30 which at that moment is located at the left in position B. An oscillating motion of small magnitude is imparted to the blocks 30 by the chain 31 similar to the oscillation of the block 16 in Fig. 1. As the blocks 30 move to the right the jaw 35 is moved toward the jaw 36 by the spring 39, separating the filaments as described in connection with Fig. 2. The said blocks 30 continue to move a short distance to the right, thus pushing the unclamped coils back up the forward face of the jaw 36 to separate them from the clamped coil.

What I claim as new and desire to secure by Letters Patent of the United States, is:—

1. In a device of the class described, the combination of a body having a flat surface, a pair of jaws on said surface, and mechanism for moving said jaws toward each other across said surface, said jaws having diverging opposing faces so as to separate out and grip one, and only one, of a group of cylindrical bodies disposed on said flat surface between said jaws.

2. In a device of the class described, the combination of a body having a flat substantially horizontal surface, a pair of jaws on said surface, and mechanism for moving said jaws toward each other across said surface, said jaws having diverging opposing faces so as to separate out and grip one, and only one, of a group of cylindrical bodies disposed on said flat surface between said jaws.

3. In a device of the class described, the combination of a body having a flat surface, a fixed jaw and a movable jaw on said surface, and mechanism for moving said movable jaw toward said fixed jaw, said jaws having diverging opposing faces so as to separate out and grip one, and only one, of a group of cylindrical bodies disposed on said flat surface between said jaws.

4. In a device of the class described, the combination of a body having a flat surface, a pair of jaws on said surface, and mechanism for moving said jaws toward each other across said surface, said jaws having opposing faces having an angle of divergence of approximately 15° therebetween so as to separate out and grip one, and only one, of a group of cylindrical bodies disposed on said flat surface between said jaws.

5. In a device of the class described, the combination of a body having a flat surface, a pair of jaws on said surface, the face of one of said jaws forming an angle of substantially 120° with said surface and the face of the other of said jaws forming an angle of substantially 45° with said surface, and mechanism for moving said jaws together to grip one, and only one, of a group of cylindrical bodies disposed on said surface between said jaws.

6. In a device of the class described, the combination of a body having a flat surface, a pair of jaws on said surface, mechanism for moving said jaws together, said jaws being so shaped as to grip one, and only one of a group of cylindrical bodies disposed on said flat surface between said jaws, a displacing element mounted adjacent to said jaws, and mechanism for actuating said displacing element to remove the loose bodies from said gripped body.

7. In a device of the class described, the combination of a body having a flat surface, a pair of jaws on said surface, mechanism for moving said jaws together, said jaws being so shaped as to grip one, and only one, of a group of cylindrical bodies disposed on said flat surface between said jaws, a displacing element mounted adjacent to said jaws, mechanism for actuating said displacing element to remove the loose bodies from said gripped body, a retaining finger disposed adjacent to said jaws, mechanism for moving said retaining finger against said loose bodies to hold them away from said gripped body, and a separating finger and mechanism for actuating said separating finger to enter between said gripped body and said loose bodies at a point adjacent to said jaws and then move in a direction parallel to the axes of said bodies to separate the end of said gripped body from the ends of said loose bodies.

8. In a device of the class described, the combination of a flat substantially horizontal plate, a plurality of spaced blocks, means for moving said blocks across said plate to displace a quantity of cylindrical objects located therebetween, a table disposed below said plate and having a stationary jaw and a movable jaw thereon, means for raising said table to the level of said plate through a slot therein to bring said jaws into operative relation with the said blocks, said movable jaw resiliently engaging one of said blocks, means for reciprocating said blocks to cause said movable jaw to travel toward the said stationary jaw and grip one, and only one, of the said cylindrical bodies located therebetween, said blocks continuing to move to separate the loose bodies from said gripped body.

JOHANNES MARINUS van der POEL.